US012673731B2

(12) United States Patent
    Schroeder

(10) Patent No.: US 12,673,731 B2
(45) Date of Patent: Jul. 7, 2026

(54) HYDROPOWER-OPTIMIZED WHEEL HOUSING SHELL

(71) Applicant: Dr. Ing. h. c. F. Porsche Aktiengesellschaft, Stuttgart (DE)

(72) Inventor: Philipp Schroeder, Korntal-Münchingen (DE)

(73) Assignee: Dr. Ing. h. c. F. Porsche Aktiengesellschaft, Stuttgart (DE)

( * ) Notice: Subject to any disclaimer, the term of this patent is extended or adjusted under 35 U.S.C. 154(b) by 273 days.

(21) Appl. No.: 18/591,377

(22) Filed: Feb. 29, 2024

(65) Prior Publication Data

US 2024/0300587 A1     Sep. 12, 2024

(30) Foreign Application Priority Data

Mar. 7, 2023     (DE) ..................... 10 2023 105 506.2

(51) Int. Cl.
    *B62D 25/18*          (2006.01)
(52) U.S. Cl.
    CPC .................................... *B62D 25/18* (2013.01)
(58) Field of Classification Search
    CPC ...... B60R 13/07; B62D 25/18; B62D 35/007; B62D 35/02; B62D 37/02
    See application file for complete search history.

(56) References Cited

U.S. PATENT DOCUMENTS

| 10,787,202 | B2 * | 9/2020 | Kondo ................. | B62D 21/15 |
| 2008/0231082 | A1 * | 9/2008 | Mathew ............... | B62D 25/161 |
| | | | | 296/198 |
| 2015/0246697 | A1 * | 9/2015 | Kishima ............. | B62D 25/025 |
| | | | | 296/180.1 |
| 2024/0300587 | A1 * | 9/2024 | Schroeder ............. | B62D 25/18 |

FOREIGN PATENT DOCUMENTS

| CN | 107107966 A | 8/2017 | |
| DE | 102008021309 A1 * | 10/2009 | ........... B62D 25/188 |
| DE | 102010050988 A1 * | 6/2011 | ............. B62D 25/16 |
| DE | 202012103620 U1 | 10/2012 | |
| DE | 102010060470 B4 * | 2/2022 | ........... B62D 25/161 |
| EP | 2979959 B1 | 5/2018 | |

(Continued)

*Primary Examiner* — Jason C Smith
(74) *Attorney, Agent, or Firm* — Buchanan Ingersoll & Rooney PC

(57)          ABSTRACT

A wheel housing shell for a vehicle having an underbody that faces a roadway, on which the motor vehicle travels during operation. During operation of the vehicle on a wet roadway, in particular when driving through shallow water, for example when aquaplaning, splash water is displaced from the wheels of the motor vehicle, which forms fountains that in turn generate at least one splash water force. To improve the wheel housing shell for the motor vehicle with respect to driving through shallow water, for example when aquaplaning, the wheel housing shell has a splash water drainage geometry in a rear region in relation to a forward driving direction, which is configured and arranged, such that the splash water in the rear region of the hydropower-optimized wheel housing shell is tangentially discharged downwards in the direction of the roadway by the splash water drainage geometry during operation of the motor vehicle.

15 Claims, 4 Drawing Sheets

(56)     References Cited

FOREIGN PATENT DOCUMENTS

| EP | 2933171 | B1 | | 7/2019 | |
|----|----|----|----|----|----|
| JP | 2014058182 | A | | 4/2014 | |
| KR | 20040044311 | A | * | 5/2004 | ............. B62D 25/18 |
| WO | 2009034814 | A1 | | 3/2009 | |
| WO | WO-2016024054 | A1 | * | 2/2016 | ............. B62D 35/02 |

* cited by examiner

HYDROPOWER-OPTIMIZED WHEEL HOUSING SHELL

CROSS-REFERENCE TO RELATED APPLICATION

This application claims priority to German Patent Application No. 10 2023 105 506.2, filed Mar. 7, 2023, the content of such application being incorporated by reference herein in its entirety.

FIELD OF THE INVENTION

The invention relates to a wheel housing shell for a motor vehicle having an underbody facing a roadway, on which the motor vehicle travels when it is operated, wherein during operation of the motor vehicle on a wet roadway, in particular when driving through shallow water, for example when aquaplaning, splash water is displaced from the wheels of the motor vehicle, which forms fountains that in turn generate at least one splash water force.

BACKGROUND OF THE INVENTION

EP 2 979 959 B1, which is incorporated by reference herein, discloses a wheel housing shell with an air guidance channel arranged in the direction of travel in the rear region of the wheel housing shell. WO 2009/034814 A1, which is incorporated by reference herein, discloses a wheel housing shell having an air guidance structure arranged in the rear region, which also prevents the conveyance of water from the roadway into the wheel housing shell. EP 2 933 171 B1, which is incorporated by reference herein, discloses an air guidance structure at a rear portion of a wheel housing shell when viewed in the direction of travel. DE 20 2012 103 620 U1, which is incorporated by reference herein, discloses an air guidance geometry in the transition area between a wheel housing shell and a vehicle floor.

SUMMARY OF THE INVENTION

Described herein is an improved wheel housing shell for a motor vehicle with regard to the operation of the motor vehicle on a wet roadway, in particular with regard to driving through shallow water, for example when aquaplaning.

In a wheel housing shell for a motor vehicle, having an underbody facing a roadway, on which the motor vehicle travels when it is operated, wherein, during operation of the motor vehicle on a wet roadway, in particular when driving through shallow water, for example when aquaplaning, splash water is displaced from the wheels of the motor vehicle, which forms fountains that in turn generate at least one splash water force, in that the wheel housing shell has a splash water drainage geometry in a rear region in relation to a forward driving direction, which is configured and arranged, such that the splash water in the rear region of the hydropower-optimized wheel housing shell is tangentially discharged downwards in the direction of the roadway by the splash water drainage geometry during operation of the vehicle. It has been found that under extreme conditions, in particular when driving through shallow water, for example when aquaplaning, at very high speeds, splash water forces can cause undesirable damage in particularly heavily loaded areas of wheel housing shells. Due to the claimed splash water drainage geometry, the splash water force can advantageously be redirected, such that it does not hit the wheel housing shell in a normal direction. Thus, undesirable damage to the wheel housing shell can also be effectively prevented if the wheel housing shell is formed from a less stable but very light plastic material. The terms rear or rearward refer to a vehicle longitudinal direction. For example, the vehicle longitudinal direction corresponds to a forward travel direction. A vehicle transverse direction extends transversely to the vehicle longitudinal direction. A vehicle height direction extends perpendicular to a plane spanned by the vehicle longitudinal direction and the vehicle transverse direction. The terms above and below refer to the vehicle height direction.

A preferred embodiment of the wheel housing shell is characterized in that the splash water drainage geometry has at least one splash water drainage surface, which is inclined at a drainage angle to the splash water force, such that the splash water is tangentially discharged downwards in the direction of the roadway at the splash water drainage surface. The previously described damage to the wheel housing shell can thus be effectively prevented. The splash water drainage surface is designed to be closed. This means that the splash water drainage surface is deliberately not provided with holes or slots. This has proven advantageous with regard to the desired splash water drainage.

Another preferred embodiment of the wheel housing shell is characterized in that the splash water drainage surface, when viewed in a vehicle longitudinal direction, is at an angle of around forty-five degrees to the roadway. This has also proven to be advantageous with regard to the desired splash water drainage downwards in the direction of the roadway at the rear of the wheel housing shell.

A further preferred embodiment of the wheel housing shell is characterized in that the splash water drainage surface is arranged in a recess, which is configured in the rear region at a lower end of the wheel housing shell. It has been found that this is where the splash water load on the wheel housing shell is greatest, in particular when driving through shallow water, for example when aquaplaning.

A further preferred embodiment of the wheel housing shell is characterized in that the recess has a dimension in a vehicle height direction that is less than a quarter of a dimension of the wheel housing shell in the vehicle height direction. This has proven to be advantageous or sufficient with regard to the desired drainage of the splash water.

Another preferred embodiment of the wheel housing shell is characterized in that the recess has a dimension in a vehicle transverse direction which is one half to two thirds of a dimension of the wheel housing shell in the vehicle transverse direction. This has also proven to be advantageous or sufficient with regard to the desired drainage of the splash water.

Another preferred embodiment of the wheel housing shell is characterized in that the recess is configured on the inside of the wheel housing shell in the transverse vehicle direction. This has proven to be advantageous both in terms of the optics of the wheel housing shell and functionality.

A further preferred embodiment of the wheel housing shell is characterized in that the recess has side walls that are arranged at an angle to each other in a trapezoidal manner. This arrangement of the side walls has also proven to be advantageous with regard to the desired downward splash water drainage at the rear of the wheel housing shell.

The invention also relates to a motor vehicle with a wheel housing shell as described above. The wheel housing shell is available separately. The claimed wheel housing shell is preferably a front wheel housing shell, which is assigned to a front wheel in a front end of the motor vehicle.

BRIEF DESCRIPTION OF THE DRAWINGS

Further advantages, features, and details of the invention arise from the following description, in which various exemplary embodiments of the invention are described in detail with reference to the drawing. Shown are.

DETAILED DESCRIPTION OF THE INVENTION

Figure 3:
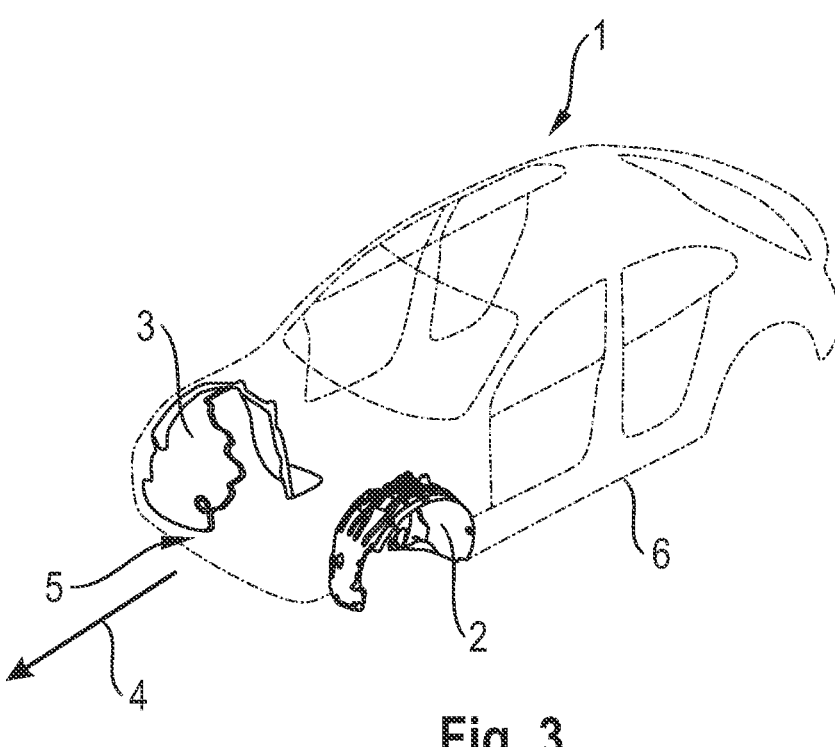
FIG. 3 depicts a schematic view of a motor vehicle with a front end, in which two wheel housing shells are arranged.

FIG. 3 shows a perspective view of a motor vehicle 1 with two wheel housing shells 2, 3 in a front end 5 of the motor vehicle 1. A forward travel direction 4 of the motor vehicle 1 is indicated by an arrow. The motor vehicle 1 has an underbody 6 which faces a roadway when the motor vehicle 1 is in driving mode.

Figure 4:
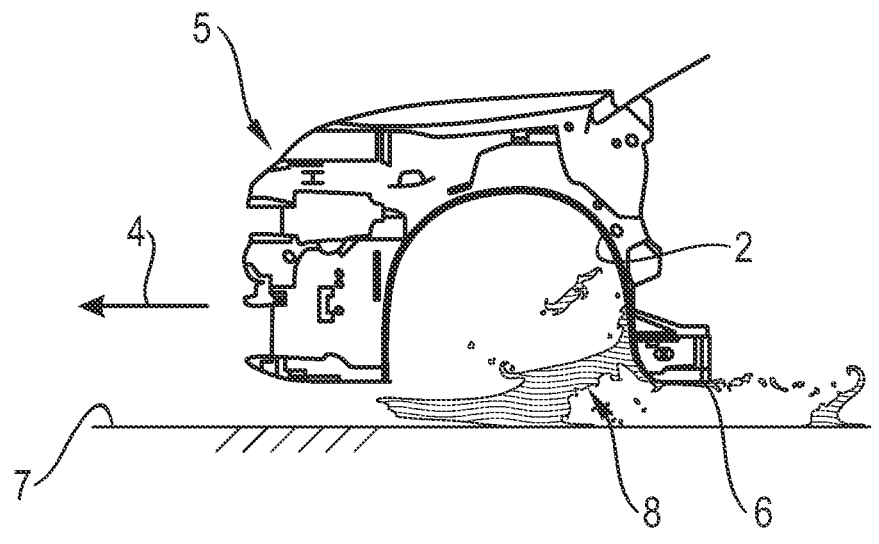
FIG. 4 is a schematic view of the front end of the motor vehicle of FIG. 3 driving through shallow water, for example when aquaplaning, in which splash water is displaced, forming fountains that generate a splash water force.

In FIG. 4, the front end 5 of the motor vehicle of FIG. 3 is indicated when driving through shallow water, for example when aquaplaning, when there is water on a roadway 7, which is displaced by the front wheels of the motor vehicle in the form of splash water 8 and forms fountains. When the motor vehicle drives through shallow water, for example when aquaplaning, these fountains lead to splash water forces that hit the underbody 6 and the wheel housing shell 2 in the front end 5 of the motor vehicle.

Figure 5:
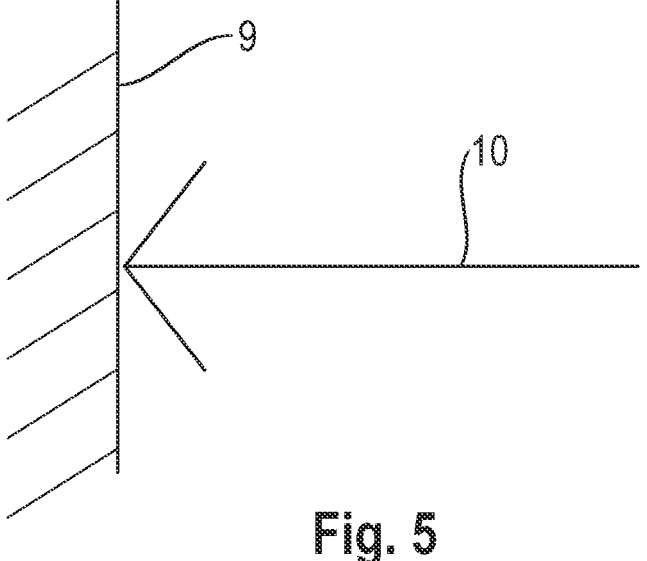
FIGS. 5 and 6 depict water when hitting a wheel housing surface or a splash water drainage surface.

In FIG. 5, an arrow indicates a splash water force 10 that hits a wheel housing surface 9 in a normal direction, that is, at a perpendicular angle.

Figure 6:
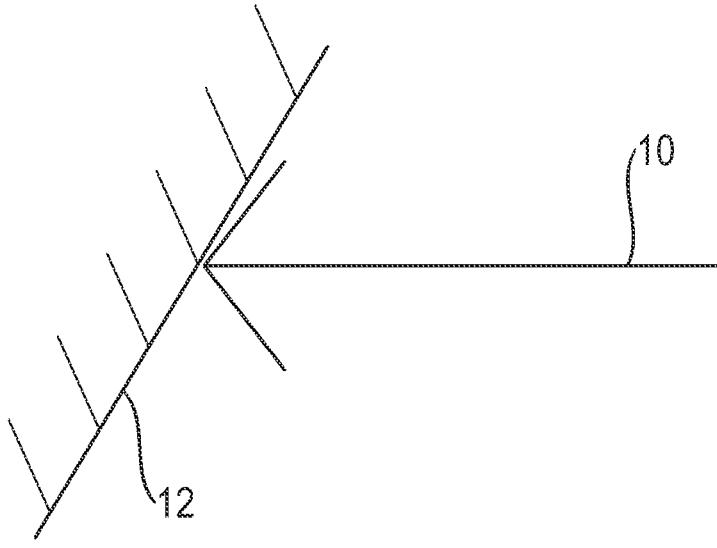

FIG. 6 shows how the splash water force 10 is tangentially discharged at an inclined splash water drainage surface 12 on the wheel housing shell in the direction of the roadway. Thus, the load on the wheel housing shell caused by the splash water force 10 can be effectively reduced.

Figure 1:
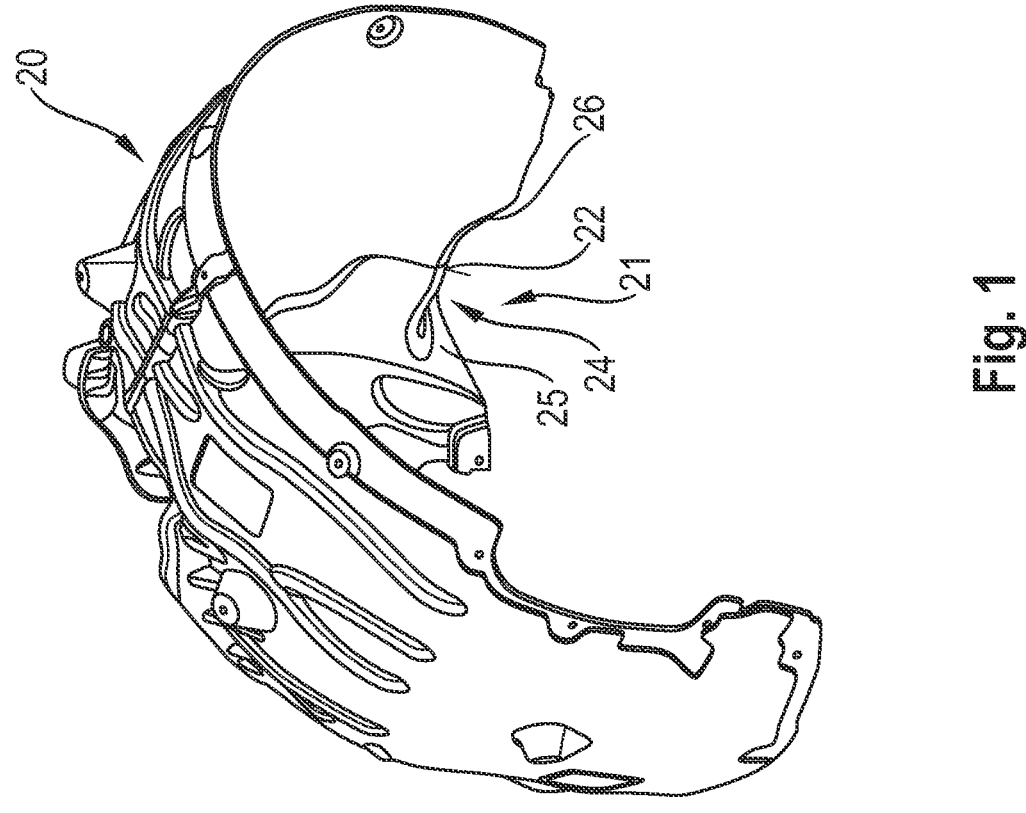
FIG. 1 depicts a perspective view of a wheel housing shell having a splash water drainage geometry according to a first exemplary embodiment.
Figure 2:
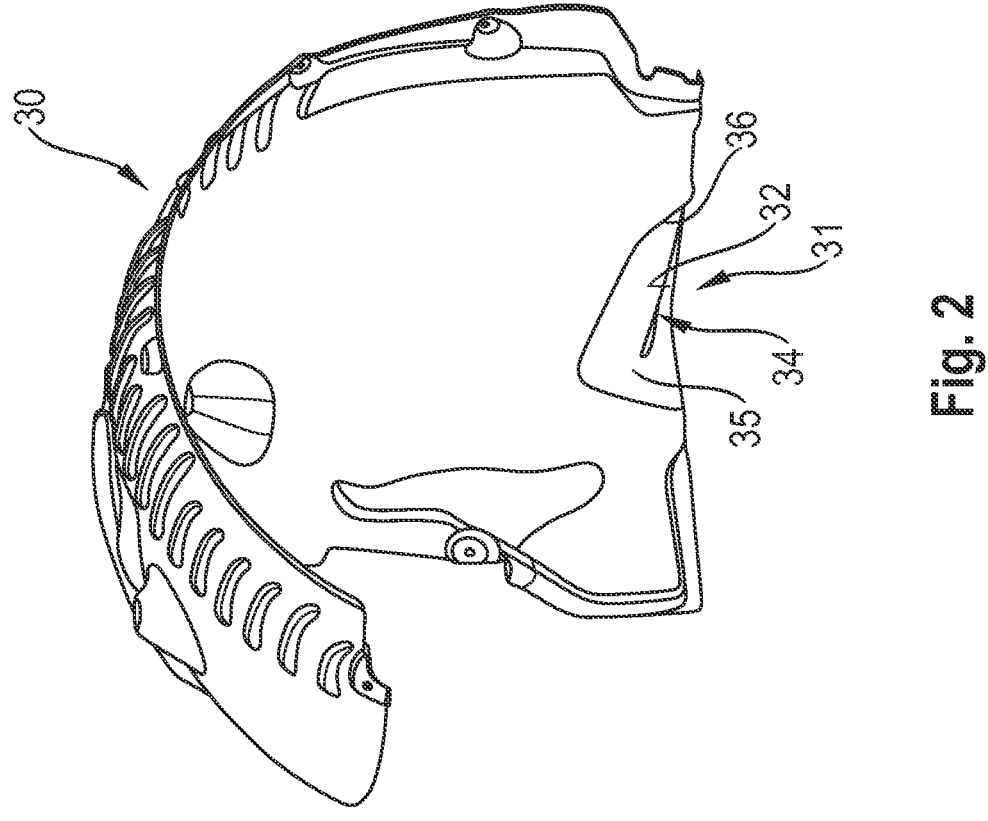
FIG. 2 depicts a perspective view of a wheel housing shell having a splash water drainage geometry according to a second exemplary embodiment.

FIGS. 1 and 2 show two exemplary embodiments of a wheel housing shell 20; 30 in a perspective view. The wheel housing shells 20; 30 are front wheel housing shells. The wheel housing shells 20; 30 are equipped with a splash water drainage geometry 21; 31 in a rear lower region. The splash water drainage geometry 21; 31 effectively reduces the splash water load when a vehicle equipped with the wheel housing shell 20; 30 drives through shallow water, for example when aquaplaning.

The splash water drainage geometry 21; 31 comprises a splash water drainage surface 22; 32. The splash water drainage surface 22; 32 is purposefully inclined, such that splash water that hits it is tangentially discharged downwards in the direction of the roadway. The splash water drainage surface 22; 32 is arranged in a recess 24; 34, which is configured for this purpose at the rear bottom of the wheel housing shell 20; 30.

The recess 24; 34 is limited at the rear bottom of the wheel housing shell 20; 30 by sidewalls 25, 26; 35, 36 that are arranged in a trapezoidal manner.

The splash water drainage geometry 21; 31 configured on the wheel housing shell 20; 30 allows the splash water to flow off tangentially at very high speeds under extreme conditions when driving through shallow water, for example when aquaplaning, without causing damage to the wheel housing shell 20; 30 from the fountain-like, splashing or gushing splash water.

REFERENCE NUMBERS

1 Motor vehicle
2 Wheel housing shell
3 Wheel housing shell
4 Forward travel direction
5 Front end
6 Underbody
7 Roadway
8 Splash water
9 Wheel housing area
10 Splash water force
12 Splash water drainage surface
20 Wheel housing shell
21 Splash water drainage geometry
22 Splash water drainage area
24 Recess
25 Side wall
26 Side wall
30 Wheel housing shell
31 Splash water drainage geometry
32 Splash water drainage surface
34 Recess
35 Side wall
36 Side wall

What is claimed is:

1. A wheel housing shell for a motor vehicle having an underbody facing a roadway on which the motor vehicle travels, wherein during operation of the motor vehicle on a wet roadway, splash water is displaced from wheels of the motor vehicle, wherein the wheel housing shell comprises:

a splash water drainage geometry in a rear region in relation to a forward travel direction of the motor vehicle, which is configured and arranged, such that the splash water in the rear region of the wheel housing shell is discharged downwards in a direction of the roadway by the splash water drainage geometry during operation of the motor vehicle, wherein the splash water drainage geometry has at least one splash water drainage surface, wherein the splash water drainage surface is arranged in a recess disposed at the rear region of the wheel housing shell and at a lower end of the wheel housing shell, wherein the wheel housing shell has a lower edge facing the roadway that extends across an entirety of an overall width dimension of the wheel housing shell including the recess, and wherein an entirety of the lower edge extends along a single common plane.

2. The wheel housing shell according to claim 1, wherein the splash water drainage surface is inclined at a drainage angle, such that the splash water is discharged downwards in the direction of the roadway at the splash water drainage surface.

3. The wheel housing shell according to claim 2, wherein the splash water drainage surface, when viewed in a vehicle longitudinal direction, is inclined at an angle of forty-five degrees with respect to the roadway.

4. The wheel housing shell according to claim 2, wherein the splash water drainage surface is arranged in a recess disposed at the rear region of the wheel housing shell and at a lower end of the wheel housing shell.

5. The wheel housing shell according to claim 4, wherein the recess has an overall height dimension in a vehicle height direction that is less than one quarter of an overall height dimension of the wheel housing shell in the vehicle height direction.

6. The wheel housing shell according to claim 4, wherein the recess has an overall width dimension in a vehicle transverse direction that is one half to two thirds of the overall width dimension of the wheel housing shell in the vehicle transverse direction.

7. The wheel housing shell according to claim 4, wherein the recess is disposed in the vehicle transverse direction at an inside of the wheel housing shell located closest to a longitudinal centerline of the motor vehicle.

8. The wheel housing shell according to claim 4, wherein the recess has a trapezoidal shape having side walls arranged diagonally to one another.

9. A motor vehicle comprising the wheel housing shell according to claim 1.

10. The wheel housing shell according to claim 1, wherein the recess is bounded by the lower edge.

11. The wheel housing shell according to claim 1, wherein the recess has a curvature as viewed across the overall width dimension of the wheel housing shell.

12. The wheel housing shell according to claim 1, wherein the wheel housing shell has a semi-circular shape extending between the lower edge and an upper edge.

13. The wheel housing shell according to claim 12, wherein the upper and lower edges sit flush with an underbody of the vehicle.

14. The wheel housing shell according to claim 1, wherein the lower edge sits flush with an underbody of the vehicle.

15. The wheel housing shell according to claim 1, wherein the lower edge intersects an underbody of the vehicle.

\* \* \* \* \*